May 20, 1930. F. FELDNER 1,758,938
ARRANGEMENT FOR PRODUCING IMMOVABLE OR MOVABLE
PROJECTED IMAGES OF PLASTIC APPEARANCE
Filed March 18, 1929
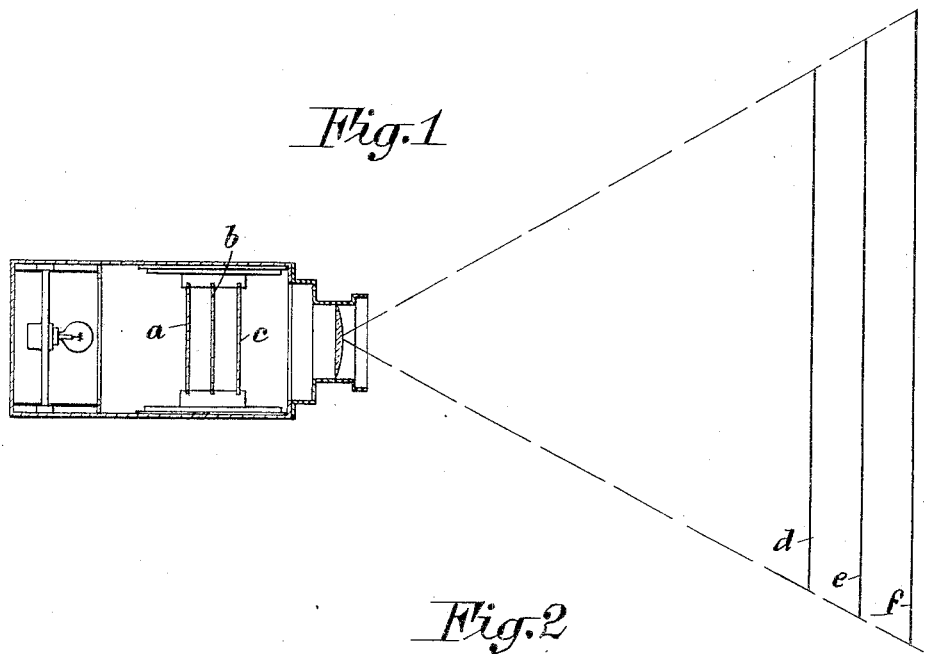
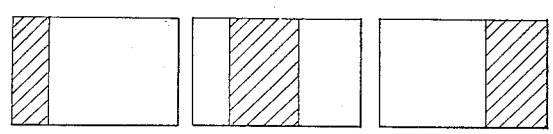
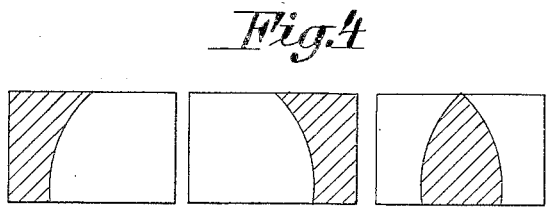

Patented May 20. 1930

1,758,938

UNITED STATES PATENT OFFICE

FRIEDRICH FELDNER, OF VIENNA, AUSTRIA, ASSIGNOR, BY MESNE ASSIGNMENTS, TO PAUL PLANER, OF VIENNA, AUSTRIA

ARRANGEMENT FOR PRODUCING IMMOVABLE OR MOVABLE PROJECTED IMAGES OF PLASTIC APPEARANCE

Application filed March 18, 1929, Serial No. 347,955, and in Austria March 24, 1928.

This invention relates to improvements in arrangements for producing immovable or movable projected images of plastic appearance, preferably for puffing or like objects.

From the known projection plants, the arrangement according to the present invention differs in the use of two or more image carriers and two or more screens. As will be hereinafter described the image carriers and screens are provided with particular divisions or sections. A single source of light and one lens are used only. The present invention differs in the following respects from the known arrangements for producing projected images of plastic appearance which are based on the additive or subtractive colour-effect.

Thus the essential feature of the present invention is a number of diapositives arranged behind one another, sections on each diapositive, the sections of all diapositives complete themselves to the desired picture, and screens arranged behind one another and corresponding in number to the number of positives, and sections on each screen corresponding to the parts of the diapositives not covered by the sections of the latter.

In the case of the known plastic projections it is not possible to produce the projection image in natural colours. This is rendered possible according to the present invention by colouring the diapositives or by photographing in natural colours. The production of the necessary images with the known plastic projection-methods is combined with great cost and a stipulation is the presence of a plastic object. By the method according to the present invention it is possible to project with a scenery like effect of depth any desired plane picture at little cost.

The subject matter of the invention is diagrammatically illustrated by way of example on the accompanying sheet of drawings in which:—

Fig. 1 is a general view of the arrangement.

Figs. 2, 3 and 4 illustrate three sets of image-frames.

Two or more image-frames arranged behind one another correspond to the like number of screens disposed behind one another. Fig. 1 shows three image-frames or faces $a$, $b$, $c$ and three screens $d$, $e$, $f$.

The particular arrangement or division of the image-frames and screens is illustrated in Figs. 2, 3 and 4. The screens are provided with the same arrangement, section or division but of a larger size.

In the supports shown in Figs. 2, 3 and 4, the parts covered with section lines are covered with the picture (part image) while the other part of each support is transparent. In the case of screens, the shaded portions indicate the surfaces onto which the pictures are projected, while the remaining part of each screen is transparent. For instance if the projection surface consists of glass, the shaded parts thereof would be frosted while the other parts remain transparent.

The divisions of the projection faces can be varied according to requirement.

If three image-faces $a$, $b$, $c$, constituting a set and provided with the corresponding sections or divisions are disposed behind one another in a projection-apparatus and if three screens provided with like sections or divisions and also arranged behind one another are used, the image $a$ will be projected on an enlarged scale on the screen $d$, the image $b$ on the screen $e$ and the image $c$ on the screen $f$.

The total effect results in a diorama, e. g. a combination of a number of projected images shown in echelon order behind one another. The distances between the individual picture-frames and between the individual screens depend on the size of the picture-frames and of the screens, the length of the projection-distance and the focus of the lens and in every case they can be determined empirical or by calculation.

Incidence projection as well as diaphanous projection may be resorted to. In the case of incidence projection the successive screens are increased while in the event of diaphanous projection the same are reduced according to the cone of light.

The spaces between the individual screens are covered with black velvet according to the borders of the division or sections of the screens.

Moving pictures (films) are projected onto a number of screens disposed behind one another in such a manner that the same number of films as screens are present and passed in successive echelon order through the apparatus. A separate toothed feed wheel is provided for each film and all wheels are operated by a Maltese cross in order to provide for a simultaneous and uniform and coincident operation of the individual images.

The necessary films can be produced in a similar manner.

I claim:—

Arrangement for producing immovable or movable projected images of plastic appearance, comprising a number of diapositives arranged behind one another, sections on each diapositive, the sections of all diapositives complete themselves to the desired picture, and screens arranged behind one another and corresponding in number to the number of positives, and sections on each screen corresponding to the parts of the diapositives not covered by the sections of the latter.

In testimony whereof I affix my signature.

FRIEDRICH FELDNER.